(12) United States Patent
Schulz et al.

(10) Patent No.: US 11,451,172 B2
(45) Date of Patent: Sep. 20, 2022

(54) ELECTRONICALLY COMMUTATED ELECTRIC MOTOR AND METHOD FOR CONTROLLING THE SAME

(71) Applicant: PIERBURG PUMP TECHNOLOGY GMBH, Neuss (DE)

(72) Inventors: Christian Schulz, Duisburg (DE); Ercan Birinci, Neuss (DE); Timo Kersten, Duesseldorf (DE); Michael Stepanow, Duesseldorf (DE); Martin Helmis, Neuss (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 351 days.

(21) Appl. No.: 16/762,145

(22) PCT Filed: Nov. 9, 2017

(86) PCT No.: PCT/EP2017/078770
§ 371 (c)(1),
(2) Date: May 7, 2020

(87) PCT Pub. No.: WO2019/091560
PCT Pub. Date: May 16, 2019

(65) Prior Publication Data
US 2020/0266734 A1 Aug. 20, 2020

(51) Int. Cl.
*H02P 6/15* (2016.01)
*H02P 6/17* (2016.01)
(52) U.S. Cl.
CPC .............. *H02P 6/157* (2016.02); *H02P 6/17* (2016.02)

(58) Field of Classification Search
CPC .. H02P 6/00; H02P 6/005; H02P 6/007; H02P 6/04; H02P 6/06; H02P 6/08;
(Continued)

(56) References Cited

U.S. PATENT DOCUMENTS

| 9,281,936 B2 * | 3/2016 | Kamatani ............ G01D 5/2451 |
| 2015/0256328 A1 | 9/2015 | Kamatani |
| 2018/0138840 A1 | 5/2018 | Joachimsmeyer et al. |

FOREIGN PATENT DOCUMENTS

| CN | 102624303 A | 8/2012 |
| DE | 10 2015 108 617 A1 | 12/2016 |

(Continued)

*Primary Examiner* — Antony M Paul
(74) *Attorney, Agent, or Firm* — Norman B. Thot

(57) ABSTRACT

An electronically commutated electric motor includes a stator with stator coil(s), a magnetized rotor which rotates relative to the stator, the magnetized rotor having at least two opposite magnet poles which generate an excitation field, a static magnetic field sensor which detects the excitation field and generates a sensor signal having signal edges, a full-wave signal period, and half-wave lengths of an N- and an S-signal level, a motor energizing device which drives the stator coil(s) and generates a revolving stator field when triggered by a trigger signal, a memory unit which saves parameter values, and an evaluation unit which generates the trigger signal via a shift compensation of an asymmetric shift of the signal edges of the sensor signal. The shift compensation is calculated based on a position of a received sensor signal edge, the full-wave signal period, and the half-wave lengths of the sensor signal.

7 Claims, 3 Drawing Sheets

(58) Field of Classification Search
CPC .... H02P 6/10; H02P 6/123; H02P 6/14; H02P 6/15; H02P 6/153; H02P 6/157; H02P 6/16; H02P 6/182; H02P 6/26; H02P 6/28; H02P 6/32; H02P 1/00; H02P 1/04; H02P 1/16; H02P 1/163; H02P 1/18; H02P 1/24; H02P 1/26; H02P 1/42; H02P 1/46; H02P 7/00; H02P 7/29; H02P 21/00; H02P 21/12; H02P 21/18; H02P 23/00; H02P 25/00; H02P 29/00; H02P 27/00; H02P 27/08
See application file for complete search history.

(56) References Cited

FOREIGN PATENT DOCUMENTS

| | | |
|---|---|---|
| EP | 2 916 108 A1 | 9/2015 |
| JP | H07-7991 A | 1/1995 |
| JP | 2001-145384 A | 5/2001 |
| JP | 2015-169528 A | 9/2015 |

* cited by examiner

ELECTRONICALLY COMMUTATED ELECTRIC MOTOR AND METHOD FOR CONTROLLING THE SAME

CROSS REFERENCE TO PRIOR APPLICATIONS

This application is a U.S. National Phase application under 35 U.S.C. § 371 of International Application No. PCT/EP2017/078770, filed on Nov. 9, 2017. The International Application was published in English on May 16, 2019 as WO 2019/091560 A1 under PCT Article 21(2).

FIELD

The present invention is directed to an electronically commutated electric motor and a method for control thereof.

BACKGROUND

Such an electric motor is provided with a stator with at least one stator coil, a magnetized rotor rotatable relative to the stator about an axis of rotation and comprising at least two opposite magnetic poles generating an excitation field, and a static magnetic field sensor detecting the excitation field and generating a rectangular sensor signal. The sensor signal features signal edges Eas, a signal period P, as well as half-wave lengths LN and LS of a N- and a S-signal level, respectively. The electric motor is also provided with a motor energizing device which drives the at least one stator coil, the motor energizing device being triggered by a trigger signal to generate a revolving stator field. The electric motor also comprises a memory unit to save parameter values and an evaluation unit which generates the trigger signal.

Electronically commutated electric motors are either provided with a sensor to detect the rotational position of the rotor or determine the rotational position of the rotor based on the counter-electromotive force (CEMF) generated in stator coils by a magnetized rotating rotor. To generate a revolving stator field, the stator coils of the electric motor are energized triggered by a trigger signal, which depends on the detected rotational position signal. All electric motors of a series are normally programmed with an identical predetermined relation between the detected rotational position signal and the trigger signal for energizing the stator coils.

EP 2 916 108 A1 describes a phase detector for determining the rotational position of the rotor of an electronically commutated motor which is provided with a plurality of motor position sensors. This allows the rotational position to be determined with a high accuracy.

DE 10 2015 108 617 A1 describes an electronically commutated motor with a control unit which comprises a characteristic trigger map containing trigger angle parameters for different rotational speeds and torques. The control signal to drive the stator coils is generated based on this characteristic trigger map, and thus depending on the present rotational speed and torque, so that an electric motor is provided which allows for an optimization of the operating behavior during operation regarding various criteria, for example, efficiency, noise and electromagnetic emissions.

The aforementioned electric motors have the disadvantage that asymmetries in the rotational position signal, in particular detected by a magnetic field sensor and, for example, caused by individual measurement errors of the sensor and/or an individual asymmetric radial magnetization of the magnetized rotor, are directly converted into an asymmetric trigger signal for energizing stator coils. This results in a torque pulsation which reduces efficiency and robustness of the electric motor, and which may cause noise and vibration.

SUMMARY

An aspect of the present invention is to individually reduce the torque pulsation of a sensor controlled electric motor.

In an embodiment, the present invention provides an electronically commutated electric motor which includes a stator comprising at least one stator coil, a magnetized rotor which is configured to rotate relative to the stator about an axis of rotation, the magnetized rotor comprising at least two opposite magnet poles which generate an excitation field, a static magnetic field sensor which is configured to detect the excitation field and to generate a rectangular sensor signal comprising signal edges, a full-wave signal period, and half-wave lengths of an N-signal level and of an S-signal level, a motor energizing device which is configured to drive the at least one stator coil and to generate a revolving stator field when triggered by a symmetric trigger signal, a memory unit which is configured to save parameter values, and an evaluation unit which is configured to generate the symmetric trigger signal. The evaluation unit generates the symmetric trigger signal via a shift compensation of an asymmetric shift of the signal edges of the rectangular sensor signal. The shift compensation is calculated based on a position of a received sensor signal edge, the full-wave signal period, and the half-wave lengths of the rectangular sensor signal.

BRIEF DESCRIPTION OF THE DRAWINGS

The present invention is described in greater detail below on the basis of embodiments and of the drawings in which.

DETAILED DESCRIPTION

Figure 1:
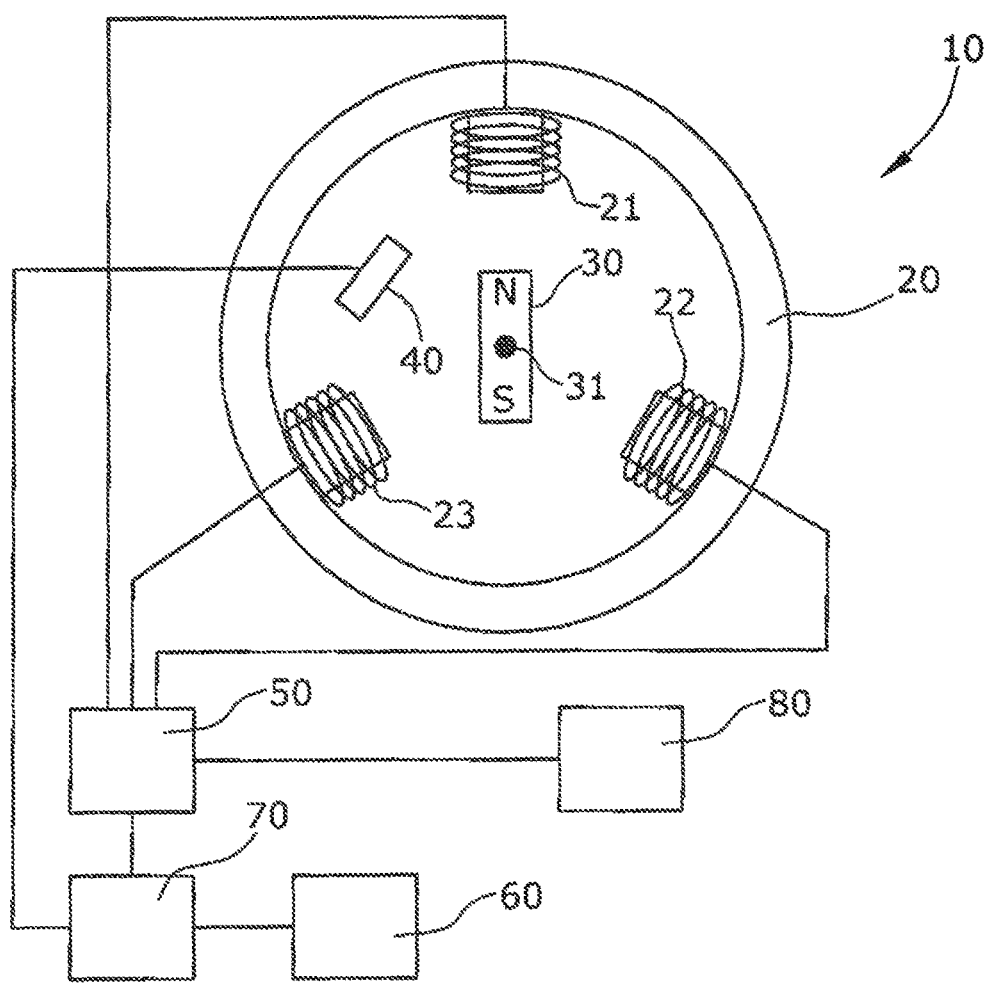
FIG. 1 shows a schematic drawing of an electronically commutated electric motor according to the present invention.

The electronically commutated electric motor according to the present invention is provided with a stator with at least one stator coil. The stator can, for example, comprise a plurality of stator coils to achieve a more homogeneous stator field and thus less torque pulsation.

The electronically commutated electric motor according to the present invention is also provided with a magnetized rotor rotatable relative to the stator about an axis of rotation. The rotor comprises at least two opposite magnet poles which generate a revolving rotor excitation field.

The electronically commutated electric motor according to the present invention is also provided with a static magnetic field sensor which detects the excitation field and which generates a rectangular sensor signal with signal edges Eas, a signal period P, as well as half-wave lengths LN and LS of an N- and an S-signal level, respectively. The full-wave signal period P is the sum of the half-wave lengths LN and LS. The term "half-wave" in this context means a signal interval with a defined signal level (either N or S) and does not imply any information on the length of the signal interval. The term "half-wave" does not mean that the N- and the S-signal level interval have the same length. The magnetic field sensor can be positioned radially or axially to the motor rotor. The magnetic field sensor can, for example, be positioned as far away as possible from the at least one stator coil so that the aerial magnetic field generated by the stator is relatively weak at the position of the magnetic field sensor.

The electronically commutated electric motor according to the present invention is also provided with a motor energizing device which drives the at least one stator coil. The motor energizing device is triggered by a trigger signal to generate a revolving stator field. The motor energizing device comprises several power semiconductors for commutating the electric energy driving the at least one stator coil.

The electronically commutated electric motor according to the present invention is also provided with a memory unit to save parameter values. The saved parameter values can, for example, be received sensor signals or calibration parameters.

The electronically commutated electric motor according to the present invention is provided with an evaluation unit which generates the trigger signal. The evaluation unit generates the symmetric trigger signal by a shift compensation of an asymmetric shift of the signal edges Eas of the sensor signal. The shift compensation is calculated on the basis of the position of the last received signal edge Eas,n, the signal period P, as well as the half-wave lengths LN and LS of the sensor signal.

The at least one stator coil is driven on the basis of an ideal symmetric trigger signal as a result. The ideal symmetric trigger signal is characterized by equidistant signal edges Ecs, meaning that the signal half-waves LN and LS have the same length. The torque pulsation of an individual electronically commutated electric motor is thus significantly decreased, which leads to an improved efficiency and robustness as well as to reduced noise and to reduced vibration of the electric motor.

The magnetized motor rotor can generally be realized in various ways. The motor rotor can, for example, be provided with an electromagnetic coil which is permanently electrically energized via brush contacts. In an embodiment of the present invention, the magnetized motor rotor can, for example, be permanently magnetized. The rotor can, for example, be realized as a ferromagnetic rotor body with separate permanent magnets, but can alternatively be provided as one single permanently magnetized rotor body. This allows for a simple and reliable embodiment of the motor rotor not requiring any energizing electronics for the rotatable motor rotor or any brush contacts which are liable to wear.

The magnetic field sensor detecting the excitation field can, for example, be a Hall sensor. Hall sensors are normally provided with a primary evaluation unit which generate a rectangular output signal.

The method for controlling an electronically commutated electric motor according to the present invention comprises the following steps:
  reception of the sensor signal from the magnetic field sensor;
  saving the received sensor signal in the memory unit;
  determination of signal edges Eas of the received sensor signal;
  determination of a signal period P as well as half-wave lengths LN and LS of a N- and a S-signal level of the sensor signal;
  calculation of signal edges Ecs of a corresponding symmetric signal with the same signal period P as that of the sensor signal using the position of the last received sensor signal edge Eas,n, the signal period P, and the half-wave lengths LN and LS of the sensor signal;
  generation of the symmetric trigger signal with the calculated signal edges Ecs; and
  energizing of the at least one stator coil using the generated symmetric trigger signal.

The calculation of the signal edges Ecs of the corresponding symmetric signal using the position of the last received sensor signal edge Eas,n, the signal period P, and the half-wave lengths LN and LS of the sensor signal can, for example, be adapted to achieve a pre-commutation $\varphi$.

The signal period P and the half-wave lengths LN and LS of the sensor signal can, for example, be determined by analyzing the last completely received signal period of the sensor signal which is received from the magnetic field sensor. The compensation mechanism thus automatically adapts itself to changes of the sensor signal during operation of the electric motor. These changes can, for example, be caused by a change of the rotational speed of the electric motor or of the load of the electric motor.

To reduce the computing effort, the signal period P and the half-wave lengths LN and LS of the sensor signal are alternatively determined once and are saved as calibration parameters in the memory unit. The calibration can be executed once right after fabrication of the motor or can be repeated, for example, after a power loss of the evaluation unit or periodically after a defined time span.

The memory unit can, for example, contain calibration parameters for different operation modes, for example, rotational speeds, of the electric motor.

An embodiment of the present invention is described below under reference to the drawings.

FIG. 1 shows an electronically commutated electric motor 10 comprising a motor stator 20, a permanent magnet motor rotor 30, a static magnetic field sensor 40, a motor energizing device 50, a memory unit 60, an evaluation unit 70, and an engine control unit 80.

The motor stator 20 comprises three stator coils 21, 22, 23 which are electrically connected to the motor energizing device 50.

The permanent magnet rotor 30 is provided with two opposite magnetic poles N, S generating an excitation field, and is rotatable relative to the motor stator 20 about an axis of rotation 31.

The static magnetic field sensor 40 detects the excitation field generated by the rotatable permanent magnet motor rotor 30 and generates a rectangular sensor signal with signal edges Eas, a signal period P, as well as half-wave lengths LN and LS of an N- and an S-signal level, respectively. The static magnetic field sensor 40 is electrically connected to the evaluation unit 70.

The motor energizing device 50 is electrically connected to the stator coils 21, 22, 23, the evaluation unit 70, and the engine control unit 80, respectively. The motor energizing device 50 receives a control signal from the engine control unit 80 specifying the operation mode (for example, on/off and/or target rotational speed) of the electric motor. According to the received operation mode parameters, the motor energizing device 50 drives the stator coils 21, 22, 23 on the basis of a trigger signal to generate an stator field revolving around the axis of rotation 31.

The memory unit 60 is capable of saving parameter values and is electrically connected to the evaluation unit 70.

The evaluation unit 70 is electrically connected to the static magnetic field sensor 40, the motor energizing device 50, and the memory unit 60, respectively. The evaluation unit 70 receives a sensor signal from the static magnetic field sensor 40, saves the sensor signal in the memory unit 60, and analyzes the received sensor signal to detect the signal edges Eas. As will be detailed below, the evaluation unit 70 compensates asymmetric shifts of the signal edges Eas of the sensor signal and generates a symmetric trigger signal with signal edges Ecs. The symmetric trigger signal is received by the motor energizing device 50 for driving the stator coils 21, 22, 23 to generate a revolving stator field.

To compensate the asymmetric shifts of the signal edges Eas of the sensor signal, the evaluation unit 70 calculates the signal edges Ecs of a corresponding symmetric signal with the same signal period P as that of the sensor signal.

Figure 2:
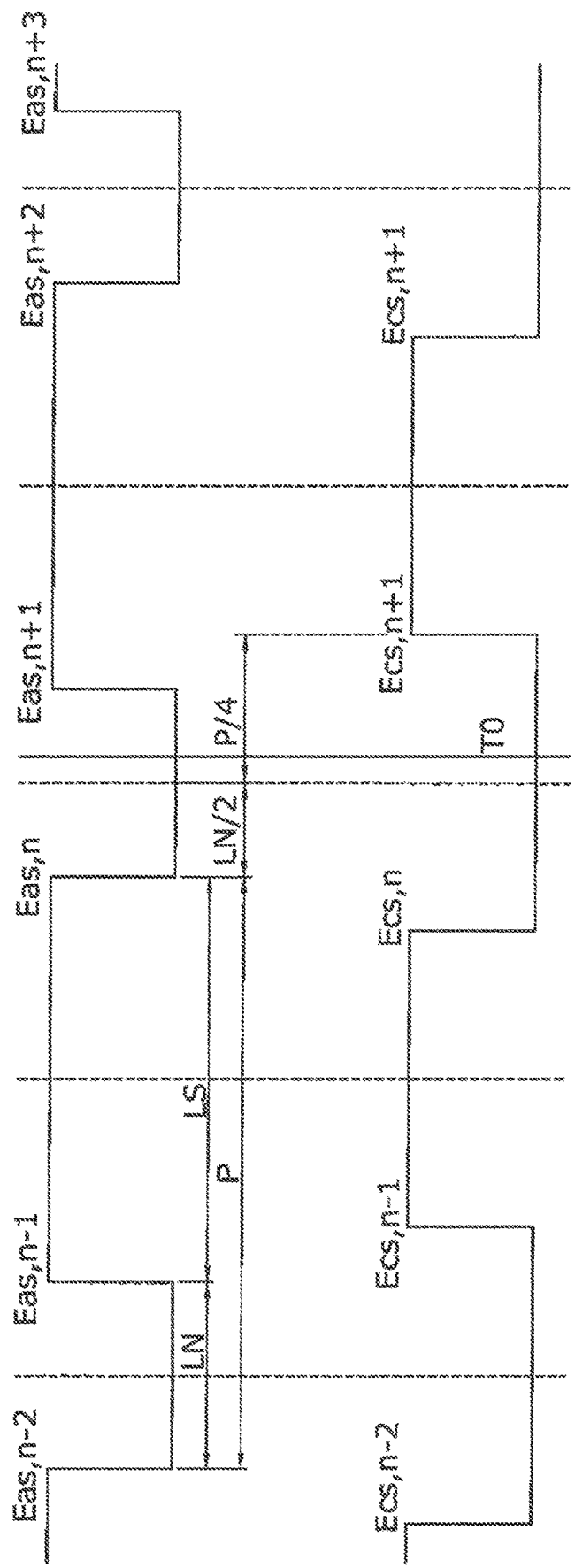
FIG. 2 shows a typical asymmetric sensor signal with signal edges Eas and a corresponding symmetric signal with signal edges Ecs and the same signal period P as that of the asymmetric sensor signal.

FIG. 2 shows a typical asymmetric sensor signal with signal edges Eas and a corresponding symmetric signal with signal edges Ecs and the same signal period P as received from the static magnetic field sensor 40. The dashed lines indicate the temporal middle of the half-waves with signal level N or S, respectively, being identical for the asymmetric sensor signal and the corresponding symmetric signal. T0 indicates the evaluation point.

To determine the next signal edge of the symmetric signal Ecs,n+1, the last received signal edge of the sensor signal Eas,n is determined by analyzing the received sensor signal which is saved in the memory unit 60.

Starting at Eas,n, the temporal middle of the present half-wave is calculated by adding half of the present signal level half-wave length I (LN or LS, respectively), here LN/2. Since the temporal middles of the half-waves as well as the signal period P are identical for the asymmetric sensor signal and the corresponding symmetric signal, the next signal edge of the symmetric signal Ecs,n+1 is calculated by adding a quarter of the period P.

As a result of being provided with the last received sensor signal edge Eas,n, the signal period P, as well as the half-wave lengths LN and LS of the N- and the S-sensor signal level, respectively, the next signal edge of the corresponding symmetric signal Ecs,n+1 can be calculated according to the equation:

$$Ecs,n+1 = Eas,n + I/2 + P/4.$$

The evaluation unit 70 generates a symmetric trigger signal on the basis of the calculated signal edges Ecs and transfers it to the motor energizing device 50 for driving the stator coils 21, 22, 23.

The stator coils 21, 22, 23 are thus driven based on a symmetric instead of an asymmetric control signal which significantly reduces torque pulsation.

Figure 3:
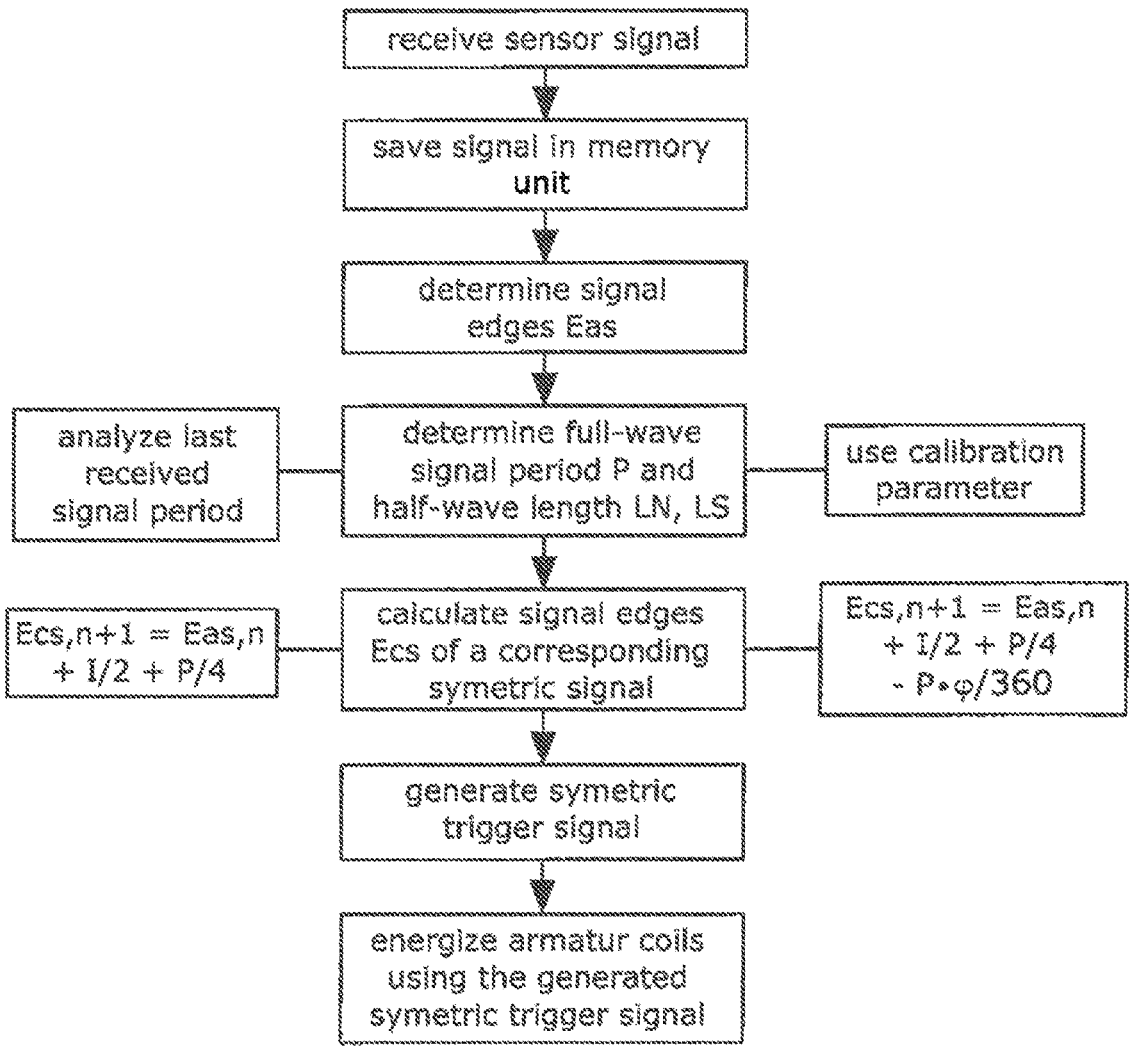
FIG. 3 shows a flow chart of a method to control an electronically commutated electric motor according to the present invention.

FIG. 3 shows a flow chart of a corresponding method to control an electronically commutated electric motor 10 according to the present invention.

In a first embodiment of the method of the present invention, the signal period P as well as the half-wave length I of the present signal level is determined by analyzing the received sensor signal. The signal period P is determined by subtraction of the last signal edge Eas,n and the antepenultimate signal edge Eas,n−2. The length I of the present half-wave is determined by subtraction of the penultimate signal edge Eas,n−1 and the antepenultimate signal edge Eas,n−2.

$$P = Eas,n - Eas,n-2$$

$$I = Eas,n-1 - Eas,n-2$$

In a second embodiment of the method of the present invention, the signal period P as well as the half-wave lengths LN and LS of the N- and the S-signal level, respectively, are saved as calibration parameters in the memory unit 60. The evaluation unit 70 analyzes the sensor signal to determine the last signal edge Eas,n and the present signal level (N or S). The signal period P and the present half-wave length I are determined by reading the corresponding parameters from the memory unit 60.

In a third embodiment of the method of the present invention, the evaluation unit 70 of the electronically communicated electric motor 10 is adapted to achieve a pre-commutation y by calculating the next signal edge Ecs,n+1 according to the equation:

$$Ecs,n+1 = Eas,n + I/2 + P/4 - P \cdot \varphi/360°.$$

The present invention is not limited to embodiments described herein; reference should be had to the appended claims.

What is claimed is:

1. An electronically commutated electric motor comprising:
a stator comprising at least one stator coil;
a magnetized rotor which is configured to rotate relative to the stator about an axis of rotation, the magnetized rotor comprising at least two opposite magnet poles which generate an excitation field;
a static magnetic field sensor which is configured to detect the excitation field and to generate a rectangular sensor signal comprising signal edges, a full-wave signal period, and half-wave lengths of an N-signal level and of an S-signal level;
a motor energizing device which is configured to drive the at least one stator coil and to generate a revolving stator field when triggered by a symmetric trigger signal;
a memory unit which is configured to save parameter values; and
an evaluation unit which is configured to generate the symmetric trigger signal,
wherein,
the evaluation unit generates the symmetric trigger signal via a shift compensation of an asymmetric shift of the signal edges of the rectangular sensor signal, the shift compensation being calculated based on a position of a received sensor signal edge, the full-wave signal period, and the half-wave lengths of the rectangular sensor signal.

2. The electronically commutated electric motor as recited in claim 1, wherein the magnetized motor rotor is permanently magnetized.

3. The electronically commutated electric motor as recited in claim 1, wherein the static magnetic field sensor is a Hall sensor.

4. A method for controlling the electronically commutated electric motor as recited in claim 1, the method comprising:
receiving the rectangular sensor signal from the static magnetic field sensor;
saving the rectangular sensor signal received in the memory unit;
determining the signal edges of the rectangular sensor signal received;
determining the full-wave signal period of the rectangular sensor signal;
determining the half-wave lengths of the N-signal level and of the S-signal level of the rectangular sensor signal;

calculating signal edges of a corresponding symmetric signal having a same full-wave signal period as that of the rectangular sensor signal using a position of the sensor signal edge, the full-wave signal period, and the half-wave lengths of the rectangular sensor signal received;

generating the symmetric trigger signal with the signal edges which were calculated; and energizing the at least one stator coil using the symmetric trigger signal which was generated.

5. The method for controlling the electronically commutated electric motor as recited in claim 4, further comprising:

adapting the calculating of the signal edges of the corresponding symmetric signal having the same full-wave signal period as that of the rectangular sensor signal using the position of the sensor signal edge, the full-wave signal period, and the half-wave lengths of the rectangular sensor signal received to achieve a pre-commutation.

6. The method for controlling the electronically commutated electric motor as recited in claim 4, wherein the full-wave signal period, and the half-wave lengths of the rectangular sensor signal are each determined by analyzing a last completely received signal period of the rectangular sensor signal received from the static magnetic field sensor.

7. The method for controlling the electronically commutated electric motor as recited in claim 4, wherein the full-wave signal period, and the half-wave lengths of the rectangular sensor signal are each determined once and are each saved as calibration parameters in the memory unit.

* * * * *